United States Patent [19]

Mitani et al.

[11] Patent Number: 5,773,093
[45] Date of Patent: Jun. 30, 1998

[54] APPARATUS FOR CONTROLLING APPLICATION OF EXCESS COATING LIQUID IN CURTAIN COATING AND METHOD OF COATING

[75] Inventors: Kameo Mitani; Haruhiko Ichimura, both of Tokyo, Japan

[73] Assignee: Mitsubishi Paper Mills Limited, Tokyo, Japan

[21] Appl. No.: 633,045

[22] Filed: Apr. 16, 1996

[30]    Foreign Application Priority Data

Jun. 2, 1995  [JP]  Japan ................................. 7-135528
 Jan. 23, 1996 [JP]  Japan ................................. 8-009376

[51] Int. Cl.$^6$ ............................. B05D 1/30; B05C 5/00
[52] U.S. Cl. ..................... 427/420; 118/324; 118/DIG. 4
[58] Field of Search ..................... 427/420; 118/DIG. 4, 118/324

[56]    References Cited

U.S. PATENT DOCUMENTS

| 3,508,947 | 4/1970 | Hughes . | |
|---|---|---|---|
| 4,851,268 | 7/1989 | Kozak | 118/DIG. 4 |
| 4,922,851 | 5/1990 | Morikawa et al. | 427/420 |
| 5,017,408 | 5/1991 | Kozak | 118/DIG. 4 |
| 5,143,759 | 9/1992 | Saito et al. | 118/DIG. 4 |
| 5,206,057 | 4/1993 | Finnicum et al. | 118/DIG. 4 |
| 5,413,818 | 5/1995 | Suga et al. | 427/420 |

FOREIGN PATENT DOCUMENTS

| 1-304076 | 12/1989 | Japan . |
| 2-503884 | 11/1990 | Japan . |
| 3-94863 | 4/1991 | Japan . |

Primary Examiner—Katherine A. Bareford
Attorney, Agent, or Firm—Finnegan, Henderson, Farabow, Garrett & Dunner, L.L.P.

[57]    ABSTRACT

The subject of the present invention is to control the generation of the contamination of a coating apparatus and web tearing which originate in an excess portion of coating color produced when commencing and terminating the coating in curtain coating. Means for solving the subject described above is a curtain coating apparatus in which a curtain film 5 flowing down vertically from a lip head 3 is allowed to contact a continuously running web 9 to form a coated layer, wherein a receiving pan 1 in which at least a coating plate disposed at the tip thereof can move in the running direction of the web 9 is disposed under the lip head 3; the coating plate 2 is connected with one end of the receiving pan 1; and the tip of the coating plate 2 has a function of being capable of sliding in a contact state with the web 9 in commencing and terminating the coating of the curtain film 5.

10 Claims, 3 Drawing Sheets

APPARATUS FOR CONTROLLING APPLICATION OF EXCESS COATING LIQUID IN CURTAIN COATING AND METHOD OF COATING

BACKGROUND OF THE INVENTION

(1) Field of the Invention

The present invention relates to a curtain coating apparatus used for applying photographic emulsions, magnetic substances, heat-sensitive color formers, pressure-sensitive color formers, and coating liquids for coated papers containing pigments as a main component, such as ink-jet image-receiving layers, heat transfer image-receiving layers, and coat papers, more specifically to a curtain coating apparatus which controls excess portions of coating color which are formed by initiating and terminating the coating, and its coating method.

(2) Description of the Prior Art

A curtain coating apparatus is a so-called pre-measuring type coating apparatus in which measuring is carried out before carrying out coating. Unlike a post-measuring type coating system in which an excess coating liquid is fed to a web and then the specified amount is weighed out, the composition of the coating liquid does not change by the lapse of time, and a coated matter showing a stable quality over an extended period of time can be obtained. Further, since multilayer coating is possible, and the coating speed has a high upper limit, a coated matter can be efficiently obtained.

Thus, since a curtain coating apparatus has many merits, it is a coating system employed in many fields such as photographic emulsions, magnetic substances, heat-sensitive color formers, pressure-sensitive color formers, pigment-coated papers, and coating for various protecting agents.

As described above, since a curtain coating apparatus is a pre-measuring type coating apparatus, and some distance is present between a web and a measuring part of a coating liquid, disturbance is exerted on the coating liquid after measuring, and the supply of the coating liquid applied on the web changes according to the lapse of time, which causes coating defects such as coating nonuniformity. Thus, the exertion of a non-steady force on a continuously formed curtain film causes the roughness on the coated layer.

In general, the coating in curtain coating is commenced by disposing a shield between a curtain film formed in advance and a web, allowing all of a coating liquid to be caught by the shield, and then removing the shield to contact the curtain film to the web. The coating is terminated by returning the shield to where it is present before starting the coating and shutting off again the curtain film from the web. In such the commencement and termination of the coating, the same phenomenon as that seen when a non-steady force is applied to the curtain film can be observed as will be described below in detail. In particular, a portion in which an excess of the coating liquid is supplied to the web (hereinafter referred to as an excess portion of coating color) is formed immediately after starting and terminating the coating operation, and since drying is delayed in this portion, rolls are contaminated by the excess portion of coating color which passes through a drying zone as the drying remains unfinished, and web tearing is caused, which makes the coating operation difficult and causes serious problems on quality.

The excess portions of coating color are formed through different steps immediately after starting and terminating the coating. That is, the coating is commenced by moving and eliminating a shield disposed between a web and a portion (hereinafter referred to as a lip) in which a coating liquid is released from a coating head. In this case, the coating liquid the dropping rate of which is controlled to zero with the shield drops freely to the web in the condition of an initial rate of zero by an operation for removing the shield. However, the coating liquid directly on the coating liquid the initial dropping rate of which is controlled to zero retains kinetic energy originating in free fall from a lip. Accordingly, difference is produced between the dropping rates in a local part at the lower end of a curtain film in commencing the coating, and a film thicker than that of the curtain film in a steady state is formed in a local part of the lower end before reaching the web, which is applied on the web, whereby an excess portion of coating color is formed.

Drying is incomplete in the excess portion of coating color formed on the web; web tearing is caused; the coating liquid is transferred on mechanical rolls used for transporting the web; and further, a part of the coating liquid transferred on the mechanical rolls is transferred again on a coated layer on the surface of the web, or in contrast with this, a normal coated layer is disturbed or peeled off, whereby coating defects are produced. Accordingly, the formation of the excess portion of coating color exerts an adverse influence on the quality of a coated matter. Further, the apparatus has to be stopped in order to remove the coating liquid contaminating the mechanical rolls, which is obliged to markedly increase the operating cost.

In stopping the coating, a shield is inserted into a curtain film to reduce the dropping rate of the curtain film present between the shield and the web to zero in a local part of the upper end of the shield, and in contrast with the commencement of the coating, the curtain film is elongated and thinned, wherein when the thickness thereof is reduced to some fixed film thickness or less, the curtain film is broken and turned into droplets, which drop on the web to form an excess portion of coating color. Accordingly, mechanical rolls are stained by the coating liquid in the excess portion of coating color as is the case with the commencement of the coating. Also in this case, a cleaning work is inevitably needed and increases the operation cost.

As means for preventing the formation of these excess portions of coating color, a method is available in which a shield used for commencing and terminating the coating is positioned as closely to a web as possible to minimize an excess amount in an excess portion of coating color. However, the shield is required to have a function as a liquid-receiving bath for receiving some amount of a coating liquid, so that the shield has to have a fixed height. Also, a function as a liquid-receiving bath is not involved in a method described in U.S. Pat. No. 3,508,947, in which the coating is commenced and terminated by a curtain deflector crossing obliquely a curtain film. In this method, however, a slope has to be provided on the curtain deflector in order to cause the liquid to fall into the liquid-receiving bath through the curtain deflector, and some distance from a web has to be kept at a fall-starting point. In these methods, minimum some centimeters are needed for a distance between the web and the fall-starting point, and therefore such methods do not provide means for preventing the formation of an excess portion of coating color.

Further, it is possible with a coating-commencing apparatus described in Japanese Patent Application Laid-Open No. Hyo-Hei 2-503884 to adjust a distance between a coating-commencing point and a web to some millimeters, but when a liquid amount on a falling curtain film is large, even some millimeters form an excess portion of coating color to a problematic extent in some cases.

As another means for preventing the formation of an excess portion of coating color, a method is available in which a shield is disposed quite near a lip to start and terminate the coating. In this method, when a slide hopper type curtain head having a slide face with a slow initial falling rate in the lip is used, an effect for controlling an excess portion of coating color is provided. However, when an extrusion type curtain head having a fast initial falling rate is used, no effects are provided.

Further, in Japanese Patent Application Laid-Open No. Hei 1-304076, a bank 11 is disposed at the tip of a liquid-receiving plate 10 as shown in FIG. 6; the back face of the bank 11 becomes a slope to a curtain film when the liquid-receiving plate moves, and a curtain film flows down on the slope, whereby an excess portion of coating color is removed. Even in this method, however, a space is produced between the lower part of the bank and the coated face of the web, and therefore the excess portion of coating color can not be completely eliminated.

Further, it is described in Japanese Patent Application Laid-Open No. Hei 3-94863 that a liquid-receiving plate is interposed between a web and an edge guide. However, a space is present between the web and a liquid-receiving plate, and an excess potion of coating color is produced when the liquid-receiving plate is pulled out.

In short, the fact has been that in curtain coating using a coating head, a system in which the coating is started and terminated without forming an excess portion of coating color has not been present up to now. An object of the present invention is to provide a curtain coating apparatus which produces no excess portion of coating color which has not been able to be solved by these known techniques.

In general, a width in a running direction of an excess portion of coating color which is produced in commencing and terminating the coating is some millimeters to some centimeters. In contrast with this, scattering in a coating-commencing point in a lateral direction of a web is different depending on the working accuracy and operation accuracy of a pan which starts and terminates the coating, or the forming state of a curtain film. Usually, it falls within a range of several meters even when the applying rate exceeds 1000 m/min.

SUMMARY OF THE INVENTION

In conventional curtain coating apparatus, a problem has been involved that a space is present between a receiving pan for a curtain coating liquid and a web, so that an excess portion of coating color is formed in starting and stopping the coating, and the excess portion of coating color produces a quality defect attributable to inferior drying, web tearing and contamination of a coating apparatus.

Accordingly, an object of the present invention is to provide a curtain coating apparatus in which quality defects attributable to inferior drying, web tearing and contamination of a coating apparatus, which are caused by an excess portion of coating color formed in commencing and stopping the coating, are removed and which is equipped with a coating plate which makes it possible to obtain a flat coated head part and end part, and a coating method.

The present invention provides a curtain coating apparatus in which a curtain film flowing down vertically from a lip head is allowed to contact a continuously running web to form a coated layer, wherein a receiving pan capable of moving in the running direction of the web is disposed under the lip head; a coating plate is connected with one end of the receiving pan; and the tip of the coating plate has a function of being capable of sliding in a contact state to the web in commencing and terminating the coating of the curtain film.

As the first method for connecting the receiving pan with the coating plate, the coating plate is connected with the receiving pan in such a manner that the tip of the coating plate is movable upward and downward.

As the second method for connecting the receiving pan with the coating plate, the coating plate is connected with the receiving pan in such a manner that the tip of the coating plate is movable only upward.

As the third method for connecting the receiving pan with the coating plate, the coating plate is fixed to the pan.

In the curtain coating apparatus described above, a wind pressure-shielding plate is disposed on a web feeding side, an outlet side or the both sides of the curtain film.

In the curtain coating apparatus described above, the coating plate has a length of 100 to 300 mm.

In the curtain coating apparatus described above, the web in the coating part of the curtain film runs slant according to a mounting difference between an inlet guide roll and an outlet guide roll.

In the curtain coating apparatus described above, the inlet guide roll is disposed below the lip head, and the web runs slant according to a mounting difference from the outlet guide roll.

In the curtain coating apparatus described above, the web is fed to the inlet guide roll from the lower part, and the wind pressure-shielding plate is disposed on a side opposite to the contact face of the inlet guide roll with the web.

In the curtain coating apparatus described above, the receiving pan moves in the forwarder part of the running web than the coating part (i.e.,the receiving pan moves forward along the running direction of the web to a position where the tip is forward of the coating part) in such a state that the tip of the coating plate contacts the web, and the receiving pan moves in the backwarder part of the web than the coating part (i.e., the receiving pan moves in a direction opposite to the running direction of the web to a point where the tip is rearward of the coating part) in such a state that the tip of the coating plate does not contact the web.

The present invention provides a curtain coating method in which the curtain film flowing down vertically from the lip head is allowed to contact the continuously running web to form a coated layer, wherein the receiving pan capable of moving in the running direction of the web is disposed under the lip head; the coating plate is connected with one end of the receiving pan; in commencing or terminating the coating of the curtain film, the receiving pan moves in the forwarder part of the running web than the coating part in such a state that the tip of the coating plate contacts the web, and the receiving pan moves in the backwarder part of the web than the coating part in such a state that the tip of the coating plate does not contact the web, whereby the coating is carried out.

DETAILED DESCRIPTION OF THE PREFERRED EMBODIMENTS

Figure 1:
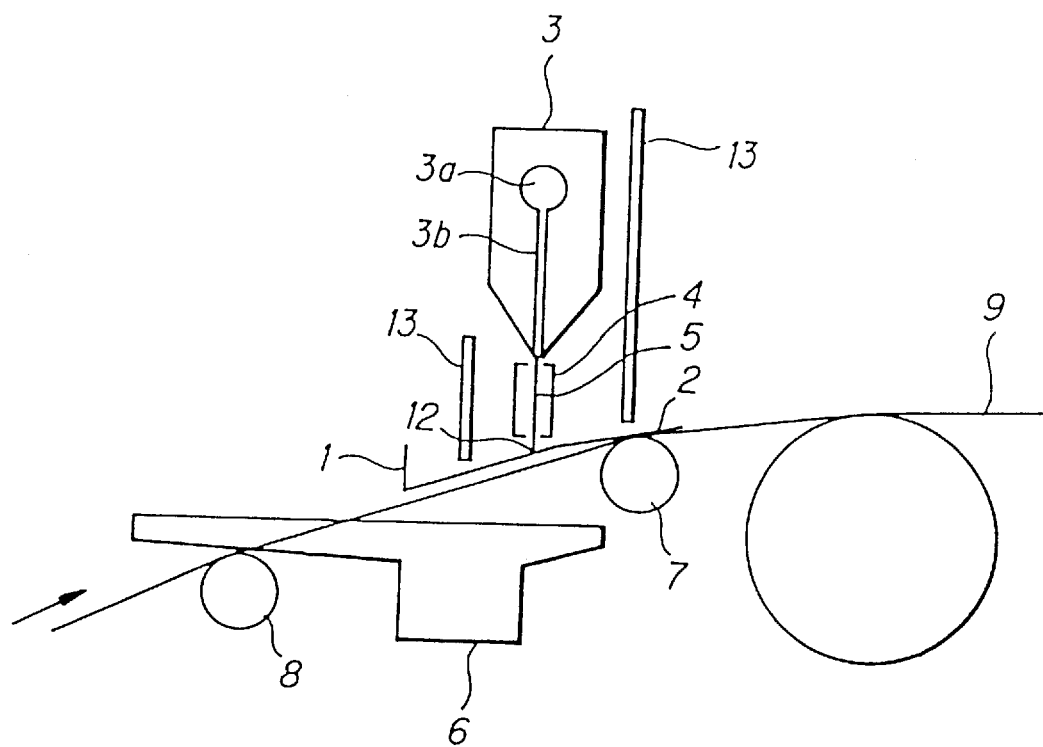
FIG. 1 is a schematic cross-sectional drawing of a curtain coating apparatus showing one example of the present invention.

The present invention provides a curtain coating apparatus in which a curtain film 5 flowing down vertically from a lip head 3 is allowed to contact a continuously running web 9 to form a coated layer, wherein a receiving pan 1 capable of moving in the running direction of the web 9 is disposed under the lip head 3; a coating plate 2 is connected with one end of the receiving pan 1; and the tip of the coating plate 2 has a function of being capable of sliding in a contact state to the web 9 in commencing and terminating the coating of the curtain film 5.

As a coating method using the coating apparatus of the present invention, the present invention provides a curtain coating apparatus method in which the curtain film 5 flowing down vertically from the lip head 3 is allowed to contact the continuously running web 9 to form a coated layer, wherein the receiving pan 1 capable of moving in the running direction of the web 9 is disposed under the lip head 3; the coating plate 2 is connected with one end of the receiving pan 1; in commencing or terminating the coating of the curtain film 5, the receiving pan 1 moves in the backwarder part (commencing) or in the forwarder part (terminating) of the running web 9 than the coating part 12 in such a state that the tip of the coating plate contacts the web 9, and the receiving pan 1 moves in the backwarder part of the web 9 than the coating part 12 in such a state that the tip of the coating plate does not contact the web 9, whereby the coating is carried out.

In the present invention, when the coating plate connected with the receiving pan is slid in commencing and terminating the coating, the receiving pan is slowly slid in starting and stopping the coating in such a state that the tip of the coating plate contacts slightly the web in the coating part, whereby the curtain film can be coated on the web through the receiving pan and the coating plate in place of directly on the web while relieving a non-steady force exerted on the curtain film. Accordingly, it is supposed that the generation of an excess portion of coating color can be controlled. Thus, a coated matter having no coating defects can be obtained without causing web tearing and contaminating the mechanical rolls of the coating apparatus.

In the present invention, the receiving pan with which the coating plate is connected at one end thereof is disposed under the lip head 3 and slid in commencing and stopping the coating in such a state that the tip of the coating plate contacts the web.

One example of a method for connecting the receiving pan 1 with the coating plate 2 includes a method in which the coating plate 2 is connected with the receiving pan in such a manner that the tip is movable upward and downward, and an another example includes a method in which the coating plate 2 is connected with the receiving pan in such a manner that the tip of the coating plate 2 is movable only upward. Further, included is a method in which the coating plate 2 is fixed to one end of the pan 1.

The curtain coating apparatus of the present invention makes it possible to carry out the uniform coating whether the web 9 runs either horizontally or slant in the coating part of the curtain film 5.

The way of causing the web 9 to run in the coating part is determined by a mounting position where the inlet guide roll 8 and the outlet guide roll 7 disposed at the both sides of the coating part are mounted. When the web is caused to run slant, the inlet guide roll 8 is mounted in a position lower than the outlet guide roll 7. The inclination angle can suitably be determined by the structures of the coater and the receiving pan 1 for the coating liquid.

Further, the inlet guide roll 8 can be disposed below the lip head 3 to cause the web 9 to run slant according to a mounting difference from the outlet guide roll 7. The web 9 is fed to the inlet guide roll 8 from the lower part, and the wind pressure-shielding plate 13 is preferably disposed on a side opposite to the contact face of the inlet guide roll 8 with the web 9 to shut off the air blown in as the web runs.

As a method for moving the receiving pan 1, the receiving pan 1 is moved in the forwarder part of the running web 9 than the coating part 12 in such a state that the tip of the coating plate contacts the web 9, and the receiving pan 1 is moved in the backwarder part of the web 9 than the coating part 12 in such a state that the tip of the coating plate does not contact the web 9.

In the present invention, any liquids can be used as the coating liquid without any limits as long as they are coating liquids capable of carrying out the curtain coating regardless of a viscosity of liquids and a solid matter concentration and includes liquids prepared by dispersing silver halides in a gelatin aqueous solution as a photographic emulsion, liquids prepared by dispersing magnetic particles in water or organic solvents as a magnetic substance coating liquid, liquids prepared by dispersing color formers and developers as a heat-sensitive color formers, liquids prepared by dispersing microcapsules containing color formers or developers as a pressure-sensitive color formers, and liquids prepared by dispersing inorganic or organic pigments as a coating liquid for coated paper containing pigments as a main component, such as an ink-jet image-receiving layer, a heat transfer imagereceiving layer and coated paper.

The web used in the present invention includes woodfree paper, medium paper, reclaimed paper, machine-coated paper, art paper, cast-coated paper, synthetic paper, resin-coated paper, plastic film, metal plate, rubber plate, and cloths woven of natural or synthetic fibers.

With respect to the coating rate, the sufficient effects can be obtained even at a coating rate of 2000 m/min or more as long as it falls within a condition range in which the curtain coating can be carried out. A liquid amount per unit time applied on the web is not specifically restricted as well.

The coating plate 2 has preferably a length of 100 to 300 mm. The width thereof is longer than those of the both side guides and such that the coating liquid flowing down can be received with the full width.

When the length is 100 mm or shorter, the coating liquid is applied before the coating liquid flowing on the coating plate can not sufficiently relieve the influence of the falling energy of the coating liquid flowing down in the form of a curtain film, so that the sufficient effects can not be obtained.

When the length is 300 mm or longer, the moving distance of the coating plate is elongated, which requires a broader space and causes the uncoated web to run in vain before coating, and therefore it is not preferred in terms of operating effectiveness.

Since the use of the curtain coating apparatus of the present invention controls the generation of an excess portion of coating color formed in commencing and terminating the coating, it becomes possible to flatten the coated layer, and web tearing caused in commencing and stopping the coating and contamination of mechanical rolls used for transporting the web by the coating liquid are removed, so that coated matters free from the generation of coating defects can be obtained.

EXAMPLES

The embodiments of the present invention shall be explained below in detail based on attached drawings. As a matter of course, however, the present invention shall not be restricted to the following examples, and various modifications can be thought out within the scope of the present invention.

FIG. 1 is a schematic cross-sectional drawing of the curtain coating apparatus showing the example of the present invention, and FIGS. 2, 3, 4 and 5 are schematic cross-sectional drawings showing the sliding state of the receiving pan.

A coating liquid prepared in advance is sent from a coating liquid storage tank to a lip head 3 with a flow-variable type non-pulse steady-flow supply pump.

The coating liquid is filled in a manifold 3a disposed in the lip head 3 and passed through a slit 3b. Then, it flows out of the lip head 3 to form a vertical curtain film 5.

Before starting the coating, the curtain film 5 is caused to flow in the receiving pan 1, and all the coating liquid is recovered in the storage tank via a recovering pan 6. In some cases, the coating liquid recovered in the receiving pan 1 is not returned in the storage tank and recovered in a different storage tank.

The coating is commenced by sliding the receiving pan 1 to move the position thereof after the running rate of the web 9 reaches a prescribed rate. The curtain film 5 flows down on a coating plate 2 connected with the receiving pan 1 to contact the continuously running web 9 via the tip of the coating plate 2 contacting the web 9, and applied on the web 5, whereby a coating-commencing operation is finished. In the above operation, the tip of the coating plate moves in the forwarder part of the running web 9 than the coating part 12 in such a state that the tip of the coating plate 12 contacts the web 9, and the receiving pan 1 moves in the backwarder part of the web 9 than the coating part 12 in such a state that the tip of the coating plate 2 does not contact the web 9, whereby the coating is carried out.

A method for connecting the coating plate 2 with the receiving pan 1 includes one connecting method in which the coating plate is fixed to one end of the receiving pan, wherein the tip of the coating plate 2 contacting the web 9 is maintained higher than the other end fixed to the receiving pan 1. This is to cause the coating liquid flowing down on the coating plate 2 to flow to the receiving pan 1 on the coating plate 2 and to prevent the coating liquid from falling on the web 9 to cause web tearing originating in an excess applied amount and the contamination of the coating apparatus.

As an another connecting method, the coating plate 2 is connected with the receiving pan 1 in such a manner that the tip of the coating plate 2 contacting the web 9 is movable only upward based on (with respect to) the other end thereof connected with the receiving pan 1, wherein the tip of the coating plate 2 is set higher than a position where the coating plate 2 is connected with the receiving pan 1. This is to prevent the coating liquid on the coating plate 2 from falling on the web 9 after the coating plate 2 slides to separate from the web 9.

In order to connect the receiving pan 1 with the coating plate 2 in an operable manner, they are connected on either the surface or the back face by means of a hinge, and in order to allow the coating liquid to flow easily on a coating liquid-flowing part in the connecting part of the both, measures such as covering the connecting part with a rubber sheet or a plastic sheet can be taken.

Further, as the other connecting method, the coating plate 2 is connected with the receiving pan in such a manner that the tip of the coating plate 2 contacting the web 9 is movable upward and downward based on (with respect to) the other end thereof connected to the receiving pan 1, wherein the coating plate 2 is connected with receiving pan 1 on either the surface or the back face by means of a hinge, and in order to allow the coating liquid to flow easily on a coating liquid-flowing part in the connecting part of the both, measures such as covering the connecting part with a rubber sheet or a plastic sheet can be taken. In case of this connecting method for the coating plate 2, whether the contacting position of the web 9 with the tip of the coating plate 2 is either higher or lower than the connecting position of the coating plate 2 with the receiving pan 1, the tip of the coating plate 2 can produce a contacting state in a position (hereinafter referred to as "a coating part") where the curtain film 5 flows down to contact the web 9 whether the web runs horizontally or slant.

When the tip of the coating plate 2 separates from the coating part of the curtain film 5 on a descendent slope, the tip of the coating plate 2 can be caused to go upward when separating from the coating part so as to prevent the coating liquid from dropping from the coating plate 2. A method therefor shall not be specifically restricted.

In order to shut off the air blown in as the web 9 runs, a wind pressure-shielding plate 13 is disposed on the web 9-feeding side of the curtain film 5, and a shielding plate 13 can be disposed as well on an outlet side. Further, the wind pressure-shielding plates 13 are preferably disposed on the both sides of the curtain film 5. These wind pressure-shielding plates 13 prevent the curtain film 5 from being disturbed by wind pressure and provide a uniform and excellent coated face.

Figure 2:
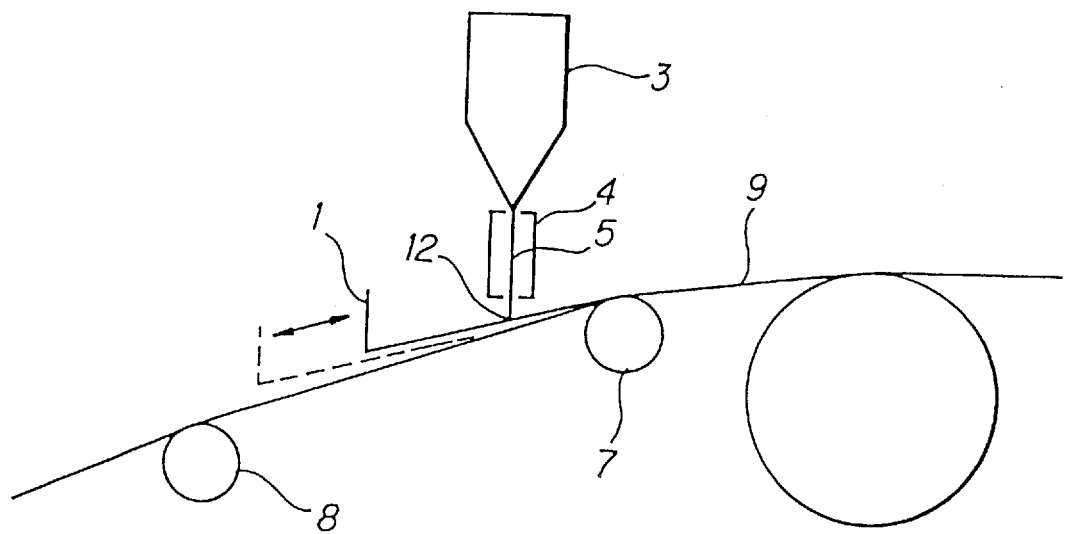
FIG. 2 is a schematic cross-sectional drawing showing one example of sliding of a receiving pan in the curtain coating apparatus of the present invention.
Figure 3:
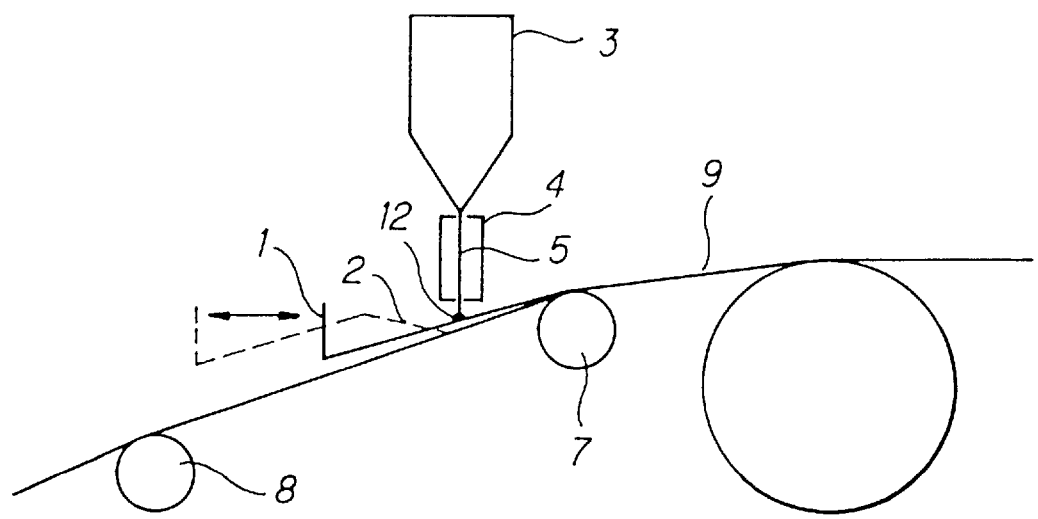
FIG. 3 is a schematic cross-sectional drawing showing one example of sliding of an another receiving pan in the curtain coating apparatus of the present invention.
Figure 4:
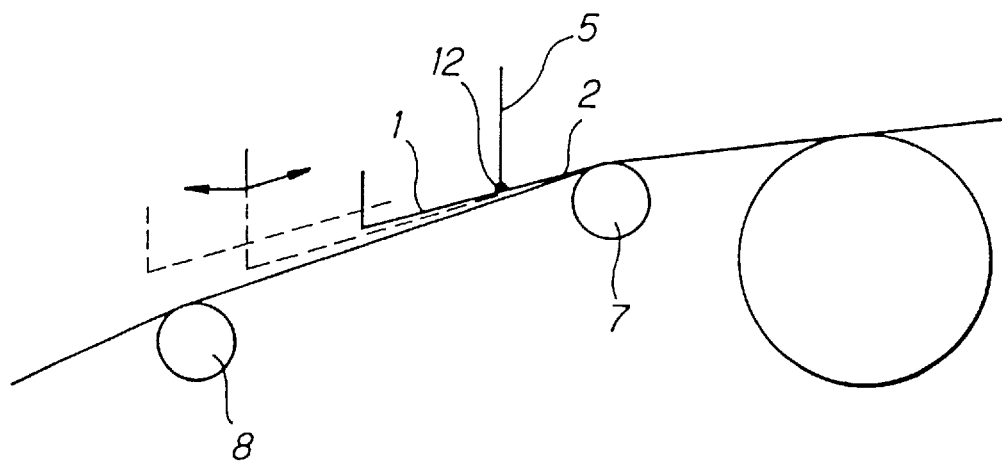
FIG. 4 is a schematic cross-sectional drawing showing one example of sliding of another receiving pan in the curtain coating apparatus of the present invention.

A method for moving the receiving pan 1 includes a method in which as shown in FIG. 2, the receiving pan 1 is moved slant in such a state that the tip of the coating plate 2 connected with the receiving pan 1 is kept contacting the web 9. Further included are a method in which the receiving pan 1 is moved in a horizontal direction as shown in FIG. 3 and a method in which as shown in FIG. 4, the receiving pan 1 moves to the coating part 12 parallel to the slope of the web 9 in the front of the coating part in the running direction of the web, and the pan is moved parallel to a floor in the rear of the coating part 12 in the running direction of the web 9.

As a moving apparatus, an air cylinder, a hydraulic cylinder, and the like can be disposed on the both sides of the receiving pan 1, and the moving rate can be preferably controlled.

Horizontal running or slant running of the continuously running web 9 can be determined depending on the structures of the coater and the receiving pan 1 for the coating liquid. The inclination of the running web can be determined according to the mounting positions of the inlet guide roll 8 and the outlet guide roll 7.

When the web is caused to run slant in the coating part, the inlet guide roll 8 can be mounted in a position lower than the mounting position of the outlet guide 7.

The wind pressure-shielding plate is preferably disposed in the coating part between the continuously running web 9 and the curtain film 5 so as to shut off an air stream accompanied with the web and cause the vertical curtain film 5 to reach the web 9 without being disturbed by the circular flow of the air around the curtain.

Figure 5:
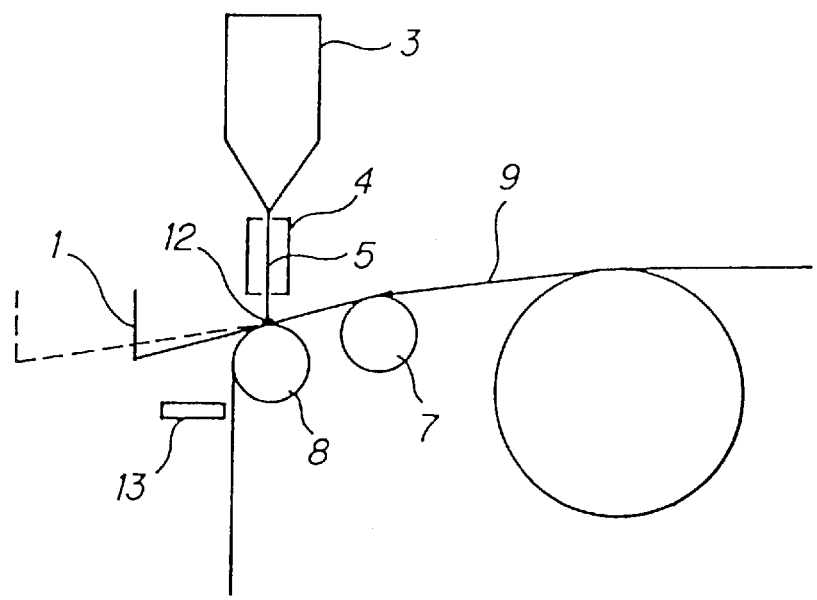
FIG. 5 is a schematic cross-sectional drawing showing one example of the arrangement of rolls for a web in the coater of the present invention.
Figure 6:
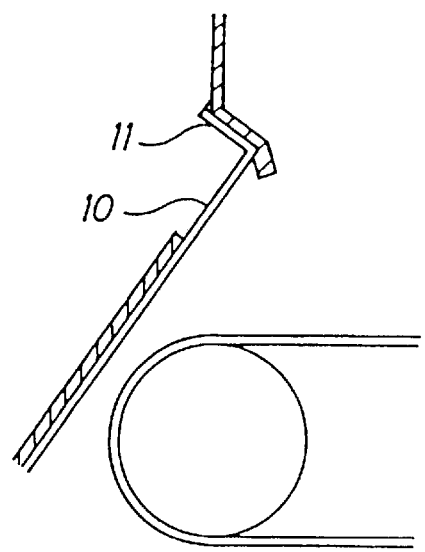
FIG. 6 is a schematic cross-sectional drawing showing a conventional liquid-receiving plate.

Further, as shown in FIG. 5, the inlet guide roll 8 can be disposed under the lip head 3 to cause the web 9 to run slant according to a mounting difference from the outlet guide roll 7. The web 9 is sent on the inlet guide roll 8 from the lower part, and the wind pressure-shielding plate 13 is disposed on an opposite side to the contact face of the inlet guide roll 8 with the web 9 so as to shut off the air blown in as the web runs.

Steel, aluminum, copper, stainless, and rigid plastic can be used as materials for the coating plate 2 used in the present invention without any limits as long as they have a sufficiently high mechanical strength.

Here, a side guard 4 is disposed in such a manner that it does not exceed the width of the lip head 3 and exceeds the width of the web 9, and the vertical curtain film 5 is formed in such a manner as exceeding the width of the web 9. The coating liquid flowing down in a width exceeding that of the web 9 is recovered in a recovering pan 6 and applied again after it is returned in a coating liquid storage tank.

Further, also when the coating is discontinued by web tearing, the coating liquid is recovered in the recovering pan 6. The coating liquid recovered in the recovering pan 6 is recovered in an another storage tank in some cases without returning to the storage tank.

The coating is terminated by moving the receiving pan 1 in the running direction of the web 9, contacting the tip of the coating plate 2 connected with one end of the receiving pan 1 to the web 9 in the position of the coating part, returning the receiving pan 1 to the position of starting the coating, and recovering the curtain film 5 in the coating part from the coating plate 2 to the receiving pan 1, whereby the terminating operation is finished.

What is claimed is:

1. A curtain coating method in which a curtain film of coating liquid flows vertically from a lip head to contact a coating part of a continuously running web to form a coated layer thereon, wherein a receiving pan capable of moving in a running direction of the web is disposed below the lip head; a coating plate is connected at a first end with one end of the receiving pan and has a tip at a second end thereof; wherein when commencing or terminating the coating of the curtain film the receiving pan is moved along the running direction of the web to a position where the tip is forward of the coating part and the tip of the coating plate contacts the web, and subsequently the receiving pan is moved in a direction opposite the running direction of the web to a position where the tip is rearward of the coating part and the tip of the coating plate does not contact the web, so that the coating layer may be formed on the web.

2. A curtain coating apparatus in which a curtain film of coating liquid flows down vertically from a lip head to contact a coating part of a continuously running web and form a coated layer thereon, which apparatus comprises a receiving pan which is moveable in a running direction of the web and is disposed below the lip head; and a coating plate having a first end connected with one end of the receiving pan, the coating plate having a tip extending from a second end thereof opposite the first end and which extends from the coating plate in the running direction of the web and which is slidable along the running direction of the web so as to contact the web when commencing and terminating the forming of the coating layer.

3. A curtain coating apparatus as described in claim 2, wherein the coating plate is connected with the receiving pan in such a manner that the tip of the coating plate is moveable upwardly and downwardly with respect to the first end of the coating plate connected to the receiving pan.

4. A curtain coating apparatus as described in claim 2, wherein the coating plate is fixedly connected to the receiving pan.

5. A curtain coating apparatus as described in claim 2, wherein a shielding plate is disposed on a web feeding side of the curtain film, an outlet side of the curtain film or both sides of the curtain film.

6. A curtain coating apparatus as described in any one of claims 2, 3, or 4, wherein the coating plate has a length of 100 to 300 mm.

7. A curtain coating apparatus as described in any one of claims 2, 3, or 4, further including an inlet guide roll and an outlet guide roll for running the web, wherein one of the rolls is higher than the other so that a portion of the web beneath the lip head runs on an incline.

8. A curtain coating apparatus as described in claim 7, wherein the inlet guide roll is disposed below the lip head, and the outlet guide roll is disposed higher than the inlet guide roll, so that the web runs upwardly on an incline.

9. A curtain coating apparatus as described in claim 8, wherein the web is fed to the inlet guide roll from below the inlet guide roll, and a shielding plate is disposed on a side of the web opposite to a contact face of the inlet guide roll with the web.

10. A curtain coating apparatus as described in any one of claims 2, 3, or 4, wherein the receiving pan moves in the running direction of web so that the tip of the coating plate is forward of the coating part and contacts the web, and the receiving pan moves in a direction opposite the running direction of the coating part so that the tip is rearward of the coating plate and does not contact the web.

* * * * *